(12) United States Patent     (10) Patent No.:    US 12,636,583 B2
Lin     (45) Date of Patent:     May 26, 2026

(54) METHOD FOR TRANSLATING GAME, ELECTRONIC DEVICE, AND STORAGE MEDIUM

(71) Applicant: NETEASE (HANGZHOU) NETWORK CO., LTD., Hangzhou (CN)

(72) Inventor: Wanghong Lin, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 151 days.

(21) Appl. No.: 18/250,364

(22) PCT Filed: Feb. 23, 2022

(86) PCT No.: PCT/CN2022/077516
§ 371 (c)(1),
(2) Date: Apr. 25, 2023

(87) PCT Pub. No.: WO2022/247366
PCT Pub. Date: Dec. 1, 2022

(65) Prior Publication Data
US 2023/0390644 A1    Dec. 7, 2023

(30) Foreign Application Priority Data
May 26, 2021    (CN) ......................... 202110579415.9

(51) Int. Cl.
*A63F 13/60*     (2014.01)
*A63F 13/35*     (2014.01)
*G06F 40/58*     (2020.01)

(52) U.S. Cl.
CPC .............. *A63F 13/60* (2014.09); *A63F 13/35* (2014.09); *G06F 40/58* (2020.01)

(58) Field of Classification Search
CPC ........ A63F 13/60; A63F 13/35; A63F 13/335; A63F 13/352; A63F 13/355; A63F 13/77; G06F 40/58
(Continued)

(56) References Cited

U.S. PATENT DOCUMENTS

| | | | |
|---|---|---|---|
| 2002/0035467 A1* | 3/2002 | Morimoto ............... | A63F 13/87 |
| | | | 455/566 |
| 2005/0261062 A1 | 11/2005 | Lewin et al. | |

(Continued)

FOREIGN PATENT DOCUMENTS

| | | |
|---|---|---|
| CN | 103316472 A | 9/2013 |
| CN | 105094905 A | 11/2015 |

(Continued)

OTHER PUBLICATIONS

Malinowski et al., "The Future of Language Technology: The Benefits and Dangers of Translation Proxy", https://www.lionbridge.com/blog/translation-localization/the-future-of-language-technology-the-benefits-and-dangers-of-translation-proxy/, Jan. 22, 2021 (Year: 2021).*

(Continued)

*Primary Examiner* — Michael A Cuff
(74) *Attorney, Agent, or Firm* — Qinghong Xu

(57) ABSTRACT

The present disclosure provides a method for translating a game, an electronic device, and a non-transitory computer-readable storage medium. The method include: establishing, by a proxy server, a communication connection between a client and a game server through the proxy server, wherein the proxy server communicates with the game server for the game; receiving, by the proxy server, game data from the game server, where the game data is sent by the game server in response to an active request or actively pushed by the game server; determining, by the proxy server, language
(Continued)

resource data contained in the game data; and translating, by the proxy server, the language resource data according to a predetermined automation service, and returning translated language resource data to the client, so that the client loads the translated language resource data.

16 Claims, 5 Drawing Sheets

(58) Field of Classification Search
USPC .......................................................... 463/42
See application file for complete search history.

(56) References Cited

U.S. PATENT DOCUMENTS

| | | | | |
|---|---|---|---|---|
| 2011/0191096 | A1 | 8/2011 | Sarikaya et al. | |
| 2021/0224491 | A1* | 7/2021 | Kim ......................... | G06F 40/58 |

FOREIGN PATENT DOCUMENTS

| | | | | | |
|---|---|---|---|---|---|
| CN | 105429981 | A | | 3/2016 | |
| CN | 106940646 | A | | 7/2017 | |
| CN | 109831523 | A | | 5/2019 | |
| CN | 111160045 | A | | 5/2020 | |
| CN | 111414767 | A | | 7/2020 | |
| CN | 112107855 | A | | 12/2020 | |
| CN | 113244624 | A | | 8/2021 | |
| JP | 6744954 | B1 | | 8/2020 | |
| KR | 20100089673 | A | * | 8/2010 | ............ G06Q 50/10 |
| KR | 20100113749 | A | | 10/2010 | |
| KR | 20140129520 | A | | 11/2014 | |
| WO | 0188704 | A1 | | 11/2001 | |

OTHER PUBLICATIONS

Reiners, Johannes, "Injecting translator object to translate my message or translate it externally? Which one is the proper OO way?", https://stackoverflow.com/questions/27780477/injecting-translator-object-to-translate-my-message-or-translate-it-externally, Jan. 5, 2015 (Year: 2015).*

1st Office Action dated Oct. 27, 2023 of Chinese Application No. 202110579415.9.

International Search Report dated May 20, 2022 of International Application No. PCT/CN2022/077516.

* cited by examiner

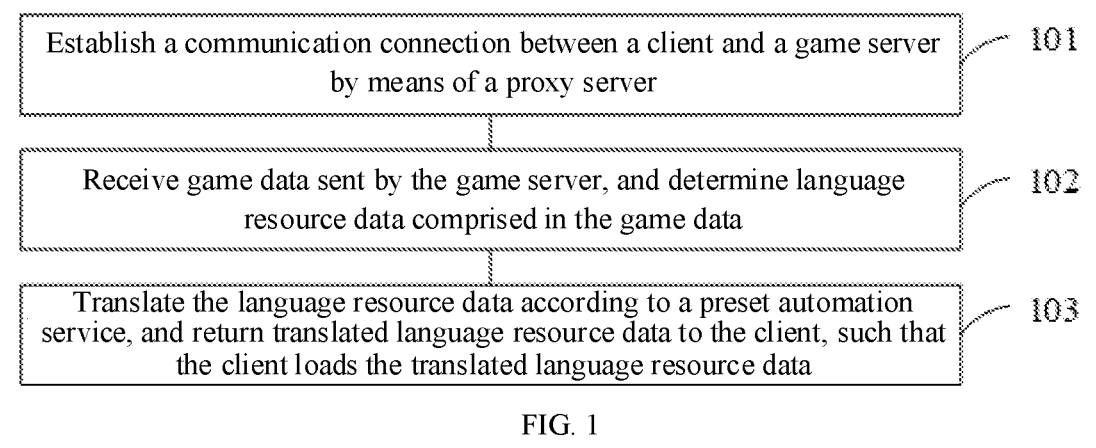

Establish a communication connection between a client and a game server by means of a proxy server ⟋ 101

Receive game data sent by the game server, and determine language resource data comprised in the game data ⟋ 102

Translate the language resource data according to a preset automation service, and return translated language resource data to the client, such that the client loads the translated language resource data ⟋ 103

FIG. 1

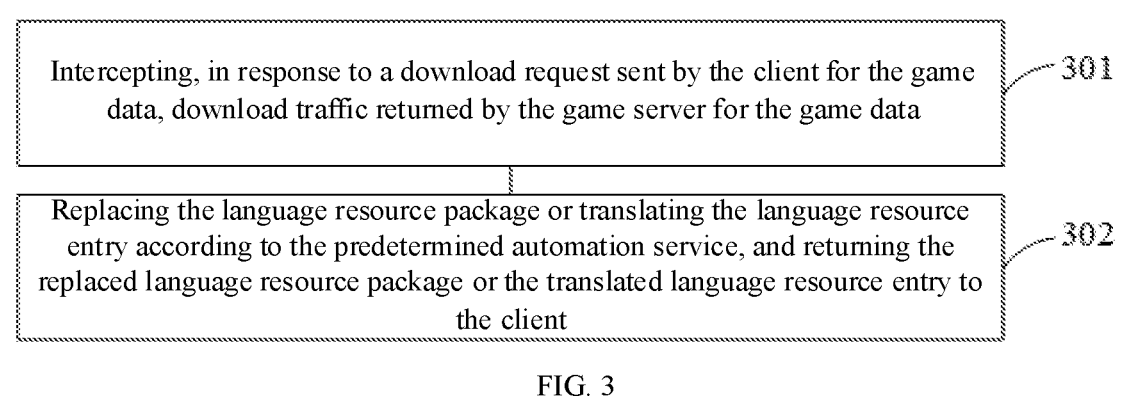

Intercepting, in response to a download request sent by the client for the game data, download traffic returned by the game server for the game data ⎰⎱ 301

Replacing the language resource package or translating the language resource entry according to the predetermined automation service, and returning the replaced language resource package or the translated language resource entry to the client ⎰⎱ 302

FIG. 3

METHOD FOR TRANSLATING GAME, ELECTRONIC DEVICE, AND STORAGE MEDIUM

CROSS-REFERENCE TO RELATED APPLICATIONS

The present disclosure is the U.S. national phase application of International Application PCT/CN2022/077516, filed on Feb. 23, 2022, which is based on and claims the priority of the Chinese Patent Application No. 202110579415.9, filed on May 26, 2021, and entitled "METHOD AND APPARATUS FOR TRANSLATING GAME", the entire contents of both of which are hereby incorporated by reference for all purposes.

TECHNICAL FIELD

The present disclosure relates to the field of computer technology, and in particular, to a method for translating a game, an electronic device, and a non-transitory computer-readable storage medium.

BACKGROUND

With the development of Internet, video games, as a globalized cultural communication method, are becoming more and more common and widespread in international communication and dissemination. However, due to the language barrier and translation cost of each region, the language barrier problem of video games has hindered the spread and communication of video games in the international community to a certain extent, which may not only make people whose native language is not the language provided by the game have a certain threshold to use when running the game, but also may make game developers and designers have a certain degree of hindrance when borrowing and learning from foreign games. The translation or localization (e.g., Chinese localization or Chinesization) of games is a problem that needs to be faced and dealt with.

SUMMARY

The present disclosure provides a method for translating a game applied to a proxy server. The proxy server communicates with a game server for the game. The method includes: establishing a communication connection between a client and the game server through the proxy server; receiving game data from the game server, where the game data is sent by the game server in response to an active request or actively pushed by the game server; determining language resource data contained in the game data; and translating the language resource data according to a pre-determined automation service, and returning translated language resource data to the client, causing the client to load the translated language resource data.

The present disclosure further provides an electronic device comprising: a processor, a memory and a computer program stored on the memory and executable by the processor. When the computer program is executed by the processor, the processor implements the method for translating the game as described above.

The present disclosure further provides a non-transitory computer-readable storage medium with a computer program stored thereon. When the computer program is executed by a processor, the processor implements the method for translating the game as described above.

It should be understood that both the foregoing general description and the following detailed description are exemplary and explanatory only and do not limit the present disclosure.

BRIEF DESCRIPTION OF THE DRAWINGS

In order to more clearly illustrate the technical solutions in the embodiments of the present disclosure, the accompanying drawings that are required to be used in the description of the embodiments will be briefly described below. It is obvious that the accompanying drawings in the following description are only some of the embodiments of the present disclosure, and other drawings may be obtained by those skilled in the art without creative effort.

FIG. 1 is a flow chart of a method for translating a game according an embodiment of the present disclosure.

FIG. 3 is a flow chart of a method for translating a game according to another embodiment of the present disclosure.

DETAILED DESCRIPTION

Figure 2:
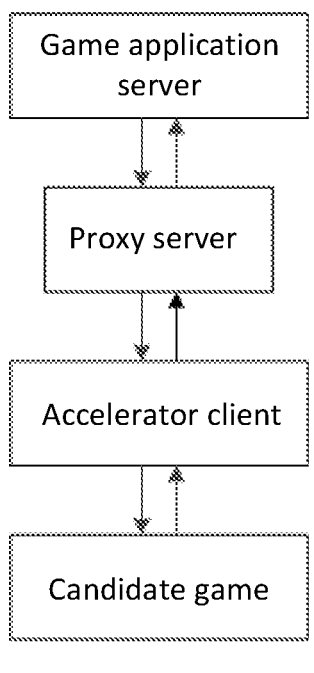
FIG. 2 is a schematic diagram of communication architecture for game translation according to embodiments of the present disclosure.

In order to make the foregoing objects, features and advantages of the present disclosure more obvious and understandable, the present disclosure is described in further detail below in conjunction with the accompanying drawings and specific embodiments.

For the convenience of those skilled in the art in understanding the present disclosure, the terminology or terms involved in the following embodiments of the present disclosure are explained below.

VPN, i.e., Virtual Private Network, is a technology that establishes a private network over the Internet.

HTTP, i.e., Hyper Text Transport Protocol, is a popular TCP/IP-based network transport protocol.

TCP, i.e., Transmission Control Protocol, is the core of the TCP/IP protocol.

UDP, i.e., User Datagram Protocol, is the core of the TCP/IP protocol.

JavaScript is a scripting language that runs primarily on browsers.

iOS is a popular mobile operating system developed by Apple Inc.

Android is a popular mobile operating system developed by Google.

Windows is popular desktop operating system developed by Microsoft.

Unicode is a widely used character set encoding technology covering most languages.

In the related game localization or translation technology, it is mainly to process the language resource package of the game. Specifically, the language resource package of the game can be found, the format of the language resource package can be manually analyzed and the corresponding game language resources can be extracted, and then the extracted game language resources can be translated and the translated game language resources can be rewritten back to the language resource package of the game. That is, by replacing the old language resource package with the new language resource package, the language resource package modified by the translation and localization will be loaded into subsequently running game, and the translated language entries are displayed in the game interface.

The above way of finding the language resource package of the game and replacing the old language resource package with the new language resource package, requires extracting and writing to the language resource package, which requires accessing the storage of the device, i.e., it is necessary to obtain read/write permission to the location in the device where the language resource package of the game is stored. However, with the privacy protection of each operating system for the applications running on it, and the protection of the game applications themselves, it is usually difficult to get access to the read/write permission to the location where the game language resource package is stored. In particular, the game language resource package can be stored in a private directory, and other programs or tools cannot read or write to the language resource package.

Due to the difficulty in obtaining read/write permission to the storage location of the game language resource package, the subsequent translation of the game language resource package is not possible. In addition, the replacement operation of the language resource package is not universal, almost impossible on iOS devices, which can only be implemented for some games on some older Android devices or need to obtain additional read/write permission from users, and may also require additional confirmation of the write prompt operation on Windows devices. Therefore, the method for translating the language resource package by accessing the read/write permission will not be secure enough for the user and the method of replacing language package by reading and writing device storage cannot be automated, so the game language resource package need to be re-downloaded or manually processed after updating, which is complicated and has high maintenance cost.

In view that certain devices cannot modify the language resource package of the game, the translation and localization operation cannot be automated, and the translation cannot be kept updated at the same time as the game, one of the embodiments of the present disclosure is to propose a scheme for translating and localizing the game by means of network traffic interception, specifically, automatically translating, localizing, and modifying the language package by intercepting and analyzing the network request traffic, so that the problem that certain games cannot be translated and localized on certain platforms or devices can be solved.

Referring to FIG. 1, a flow chart of steps of a method for translating a game according to an embodiment of the present disclosure is shown, which is applied to a proxy server, the proxy server communicating with a game server for the game, and may specifically include the following steps.

Step 101, establishing a communication connection between a client and the game server through the proxy server.

The embodiments of the present disclosure can be applied to a proxy server. The proxy server can communicate with the game server for the game and can communicate with the client, where the client can have a proxy service deployed on it, and the deployed proxy service can be turned on to form a communication link, i.e., the client with the proxy service turned on—the proxy server—the upstream game server.

Referring to FIG. 2, a schematic diagram of communication architecture for game translation according to embodiments of the present disclosure is shown, with the proxy server acting as an intermediary between the game server and the client. The game server can refer to the game application server for the game located upstream of the client, while the client can refer to the accelerator client.

Here, the accelerator can be a kind of installation-free application, and the application can include a plurality of games. Users can directly double-click to use the accelerator, and can directly select the game for acceleration after successful verification. Assuming that the game currently selected for acceleration is a candidate game (i.e., a game to be translated), the client can forward traffic through VPN via the proxy server over the uplink, and the proxy server can receive the game data sent by the game application server, i.e., the download traffic on the downlink is intercepted by the proxy server, so that after the game is translated by processing the game data automatically, the translated language resources can be sent to the accelerator client.

Step 102, receiving game data from the game server and determining language resource data contained in the game data.

In practice, for some large games, the language resource package of the game is usually stored in a separate file and downloaded and updated as part of the game resources, which allows the size of the game distribution package to be reduced so that users can download and enter the game quickly on one hand, and keeps the separate file with the language resource package stored dynamically updated on the other hand.

In one embodiment of the present disclosure, the game data sent by the game server can be intercepted by the proxy server, i.e., the game data sent by the game server is not sent directly to the client, so that the proxy server can process the intercepted game data. Specifically, the proxy server can determine the language resource data contained in the game data, and process the language resource data.

The received game data may be data sent by the game server in response to an active request, or data actively pushed by the game server, such as actively pushing updated game data based on the version number of the client, which is not limited in the embodiments of the present disclosure.

Step 103, translating the language resource data according to a predetermined automation service, and returning translated language resource data to the client, causing the client to load the translated language resource data.

In one embodiment of the present disclosure, processing the intercepted language resource data may be performed by translating the intercepted language resource data according to the predetermined automation service, so as to return the translated language resource data to the client, enabling the client to display the interface text corresponding to the translated language resource data in the game interface when running the game, realizing the purpose of translation and localization of the game.

Specifically, for the translation operation of the intercepted language resource data, the language resource data may include a language resource package and/or a language resource entry. In this case, the language resource data may be intercepted to be replaced with a translated language resource package, or the language resource entries in the download traffic may be directly translated to return the translated language entries to the client.

It should be noted that since all the execution logic of replacing and changing the language resource package takes place on the proxy server side, no additional read/write permissions are required on the device on which the game runs (i.e. the client). Therefore, this method for translating the language resource package of the game is easy to operate and can be automated on the proxy server while making it almost imperceptible to the users on the game client.

The embodiments of the present application are applied to a proxy server. A communication connection can be established between a client and a game server by the proxy server, and the proxy server can receive game data from the game server. The received game data may be the data sent by the game server in response to an active request or actively pushed by the game server. In response to the received game data including language resource data, the proxy server can translate the language resource data according to a predetermined automation service deployed thereto and return the translated language resource data to the client so that the client can load the translated language resource data. By way of intercepting and analyzing the language resource data contained within the network request traffic, the language resource data is automatically translated, localized, and modified without obtaining the read/write permission to the game language resource package on the game running device, which enables the game to be translated and localized on certain devices that cannot realize translation and localization.

Referring to FIG. 3, a flow chart of steps of a method for translating a game according to another embodiment of the present disclosure is shown, applied to a proxy server that can establish a communication connection between a client and a game server for the game. When received game data is data sent by the game server in response to an active request, the method may specifically include the following steps.

Step 301, intercepting, in response to a download request sent by the client for the game data, download traffic returned by the game server for the game data.

In one embodiment of the present disclosure, in the case where the received game data is sent by the game server in response to the active request, the game server is required to return game data in response to a download request sent by the client. In this case, the proxy server can intercept the game data returned by the game server to process the intercepted game data.

In this embodiment, the proxy server can intercept and process the returned game data, which can be realized by intercepting and processing the download traffic that passes through. Specifically, the proxy server intercepts the download traffic for the game, and the intercepted download traffic is essentially the network traffic returned by the upstream game server in response to the download request. In practical application, the download traffic returned by the upstream game server may include the language resource data of the game. For the resource download of some games, the resource download traffic is processed using HTTP or unencrypted TCP/UDP, that is, the download traffic is transmitted in plaintext. In this case, the language resource data in the download traffic can be intercepted or captured, in order to realize the method for translating and localizing of the game through network traffic interception.

Specifically, the download request sent by the client for the game is received by the proxy server, and the received download request can be a download request generated by the client and sent to the game server. In this case, the proxy server, as an intermediary between the client with proxy service turned on and the game server, can forward the download request to the upstream game server, so that the game server can return the download traffic to the client in response to the download request.

In practical application, for some large games, the language resource package of the game is usually stored in a separate file and downloaded and updated as part of the game resources, which allows the size of the game distribution package to be reduced so that users can download and enter the game quickly on the one hand, and keeps the separate file with the language resource package stored dynamically updated on the other hand.

When the user updates and downloads the game data through the client, a VPN or HTTP proxy can be established on the device where the game is running, which is equivalent to turning on the deployed proxy service, so that the download traffic of the game can pass through the established VPN or HTTP (i.e. proxy server) for proxy, and the proxy server can process the download traffic that passes through.

On the service side of VPN or HTTP proxy, all the traffic for the network request of the game can be intercepted, and therefore, whether the intercepted download traffic includes the language resource package of the game or the language resource entry of the game can be judged. Specifically, the judgment can be realized by determining that the download request generated by the client is the download request directed at the language resource data of the game. The download traffic of the game can be subsequently intercepted by the result of the judgment.

In a specific implementation, feature information of the download request can be obtained, and then, whether the download request generated by the client is an HTTP download request directed at the language resource package, or a download request directed at the language resource entry, can be determined according to the feature information. In one embodiment of the present disclosure, the feature information of the download request may include a request path of the download request. In this embodiment, resource name information in the request path of the download request, and a name feature directed at the language resource data, may be obtained. Since the request path of the download request may include multiple resource data with a plurality pieces of resource name information, whether target resource name information that matches a naming feature of the language resource data exists among the plurality pieces of resource name information of the request path, can be determined. In response to the target resource name information existing, resource data corresponding to the target resource name information can be determined as first target resource data among the multiple resource data of the request path, and whether second target resource data having a predetermined character exists in the first target resource data can be determined. In response to the second target resource data existing, the download request can be determined as a download request directed at the language resource data of the game, that is, the download traffic intercepted subsequently contains the language resource data, and the download traffic returned in response to the download request can be intercepted by the proxy service turned on by the client (i.e., through the proxy server).

If there is no target resource name information that matches the naming feature of the language resource data among the plurality pieces of resource name information of the request path, or if there is no second target resource data having a predetermined character in the first target resource data, it may indicate that the download request generated by the client is not a request directed at the language resource data of the game, i.e., the subsequent intercepted download traffic does not contain any language resource data, so the download traffic returned by the game server in response to this download request may not be intercepted in this case.

In practical application, the features of unencrypted download traffic can be analyzed to get feature information.

First, whether the file name in the request path contains "language", "locale", "lang", "message", "text", "ui" and other obvious naming features of the language resource data, can be checked to narrow down the search range. Second, the target file (equivalent to the first target language resource data) within the narrowed range can be searched for Unicode character sets. Different candidate languages (i.e., languages to be translated) have different Unicode character sets, which need to be handled according to different actual situations. If the network request traffic contains the candidate language resource data, the candidate language resource data can be further translated and the translated language resource data can be returned to the client.

Step 302, replacing the language resource package or translating the language resource entry according to the predetermined automation service, and returning the replaced language resource package or the translated language resource entry to the client.

In this embodiment, the language resource data can be translated, and then the translated resource data can be returned to the client. The client can receive the translated language resource data while downloading updated game data from the game server or receiving the game data sent by the game server actively. That is, the client can load the translated language resource entries and language resources, display the translated and localized language, so that the purpose of translation and localization can be achieved.

The language resource data may include a language resource package directed at the game and/or a language resource entry directed at the game.

In one case, when the language resource data is the language resource package directed at the game, additional automation services can be deployed on the proxy server. The deployed and predetermined automation service can be employed to perform format analysis of the language resource package directed at the game to obtain packet format information, candidate language resource entries (i.e., the language resource entries to be translated) can be extracted from the language resource package, and then the candidate language resource entries can be translated. Further, the translated language resource entries can be packaged according to the packet format information to generate a target language resource package, i.e., a translated language resource package, and finally the target language resource package can be returned to the client to realize the automation of translation and localization.

In another case, when the language resource data is the language resource entry directed at the game, the language resource entries directed at the game can be translated one by one using the predetermined automation service to obtain a translated language resource entries, and finally, the translated language resource entries can be returned to the client to realize the automation of translation and localization.

In a preferred embodiment, code logic having translation function can also be obtained, and the code logic can be injected into the intercepted download traffic to obtain target download traffic, and finally the target download traffic can be returned to the client to realize the automation of translation and localization.

For example, for some web games, a piece of code logic having translation function can be injected during the traffic interception, such as JavaScript containing translation and localization functions, so that the injected JavaScript will be loaded and run by the game, so that the code related to the translation and localization can be executed when the game is running, and the purpose of translating for localization of the game can be achieved, which is not limited in the embodiments of the present disclosure.

It should be noted that for different game language resource data, the resource names and resource packet formats are very different, the translated languages are different, and there are also many kinds of implementation frameworks of the proxy server. Due to the aforementioned different uncertain factors, it may lead to specific implementation details also vary greatly. Therefore, the solution described in the embodiments of the present disclosure mainly describes the general technical parts, and the specific implementation process that is not general is not limited in the embodiments of the present disclosure.

In the embodiments of the present disclosure, by intercepting network traffic through VPN or HTTP proxy, it is not necessary to obtain the read/write permission to the game language resource package on the game running device, so that the game can be localized (e.g., translated into Chinese) on some devices that cannot realize translation and localization, expanding the category of games that can be localized. In addition, since the replacement is performed on the proxy server side at the network traffic level, the automation of the translation can be achieved, reducing manual intervention, as well as, keeping the translation and localization updated in time when the game language resources are updated.

It should be noted that for method embodiments, they are all expressed as a series of combinations of actions for simplicity of description, but those of skill in the art should be aware that the embodiments of the present disclosure are not limited by the described sequence of actions, as certain steps may be performed in other sequences or simultaneously according to the embodiments of the present disclosure. Second, those of skill in the art should also be aware that the embodiments described in the specification are preferred embodiments and that the actions involved are not necessarily necessary for the embodiments of the present disclosure.

Figure 4:
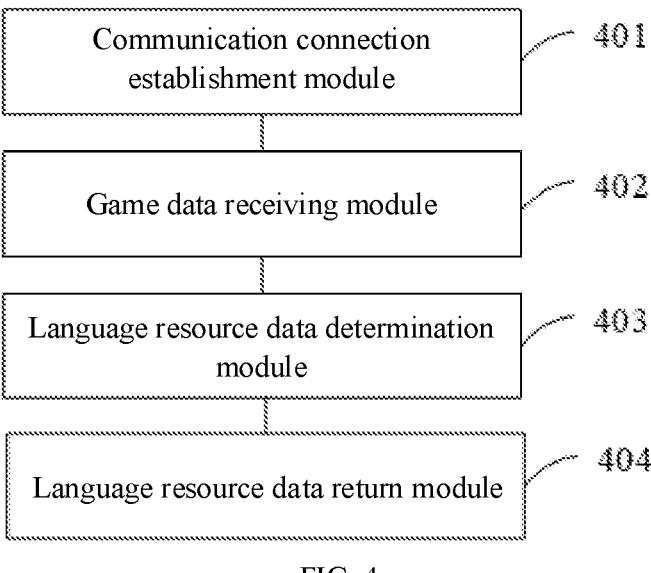
FIG. 4 is a block diagram of a structure of an apparatus for translating a game according to an embodiment of the present disclosure.

Referring to FIG. 4, a block diagram of a structure of an apparatus for translating a game according to an embodiment of the present disclosure is shown, which is applied to a proxy server, the proxy server communicating with a game server for the game, and may specifically include the following modules.

A communication connection establishment module 401 is configured to establish a communication connection between a client and the game server through the proxy server.

A game data receiving module 402 is configured to receive game data from the game server, where the game data is sent by the game server in response to an active request or actively pushed by the game server.

A language resource data determination module 403 is configured to determine language resource data contained in the game data.

A language resource data return module 404 is configured to translate the language resource data according to a predetermined automation service and return translated language resource data to the client, causing the client to load the translated language resource data.

In one embodiment of the present disclosure, when the game data is sent by the game server in response to the active request, the apparatus may further include the following modules.

A download request response module is configured to obtain, in response to a download request sent by the client for the game data, feature information of the download request, where the client has turned on a proxy service deployed thereto. A download request determination module is configured to determine whether the download request is directed at the language resource data according to the feature information.

A download traffic interception module is configured to intercept, in response to the download request being directed at the language resource data, download traffic returned by the game server for the game data based on the proxy service.

In one embodiment of the present disclosure, the feature information includes a request path of the download request, and the download request determination module may further include the following sub-modules.

A name information obtaining sub-module is configured to obtain resource name information in the request path of the download request, and a name feature directed at the language resource data, where the request path of the download request includes multiple resource data with a plurality pieces of resource name information.

A target resource name information determination sub-module is configured to determine whether target resource name information that matches a naming feature of the language resource data exists among the plurality pieces of resource name information of the request path.

A second target resource data determination sub-module is configured to, in response to the target resource name information existing, determine, among the multiple resource data of the request path, resource data corresponding to the target resource name information as first target resource data, and determine whether second target resource data having a predetermined character exists in the first target resource data.

A download request determination sub-module is configured to, in response to the second target resource data existing, determine that the download request is directed at the language resource data.

In one embodiment of the present disclosure, the language resource data includes a language resource package and/or a language resource entry.

In one embodiment of the present disclosure, the language resource data return module 404 may include the following sub-modules.

A packet format analysis sub-module is configured to obtain packet format information by performing format analysis of the language resource package using the predetermined automation service, and extract a candidate language resource entry from the language resource package.

A resource packet generation sub-module is configured to translate the candidate language resource entry, and generate a target language resource package by packaging translated language resource entry according to the packet format information.

A resource packet return sub-module is configured to return the target language resource package to the client.

In one embodiment of the present disclosure, the language resource data return module 404 may include the following sub-modules.

A resource data entry translation sub-module is configured to translate language resource entries one by one using the predetermined automation service, and obtain translated language resource entries.

A resource data entry return sub-module is configured to return the translated language resource entries to the client.

In one embodiment of the present disclosure, the apparatus may further include the following modules.

A code logic obtaining module is configured to obtain code logic having a translation function.

A target download traffic return module is configured to obtain target download traffic by injecting the code logic into intercepted download traffic, and return the target download traffic to the client.

The device embodiments are described briefly because they are substantially similar to the method embodiments, and where relevant, please refer to the description of the method embodiments.

The embodiments of the present disclosure further provide an electronic device, including: a processor, a memory, and a computer program stored on the memory and executable by the processor. When the computer program is executed by the processor, the processor implements the following method or steps: establishing a communication connection between a client and the game server through the proxy server; receiving game data from the game server, where the game data is sent by the game server in response to an active request or actively pushed by the game server; determining language resource data contained in the game data; and translating the language resource data according to a predetermined automation service, and returning translated language resource data to the client, causing the client to load the translated language resource data.

Optionally, when the game data is sent by the game server in response to the active request, the method further includes: obtaining, in response to a download request sent by the client for the game data, feature information of the download request, where the client has turned on a proxy service deployed thereto; determining whether the download request is directed at the language resource data according to the feature information; and intercepting, in response to the download request being directed at the language resource data, download traffic returned by the game server for the game data based on the proxy service.

Optionally, the feature information includes a request path of the download request, and the determining whether the download request is directed at the language resource data according to the feature information, includes: obtaining resource name information in the request path of the download request, and a name feature directed at the language resource data, where the request path of the download request includes multiple resource data with a plurality pieces of resource name information; determining whether target resource name information that matches a naming feature of the language resource data exists among the plurality pieces of resource name information of the request path; in response to the target resource name information existing, determining, among the multiple resource data of the request path, resource data corresponding to the target resource name information as first target resource data, and determining whether second target resource data having a predetermined character exists in the first target resource data; and in response to the second target resource data existing, determining that the download request is directed at the language resource data.

Optionally, the language resource data includes a language resource package and/or a language resource entry.

Optionally, the translating the language resource data according to a predetermined automation service and returning translated language resource data to the client, includes: obtaining packet format information by performing format analysis of the language resource package using the predetermined automation service, and extracting a candidate language resource entry from the language resource package; and translating the candidate language resource entry, and generating a target language resource package by packaging translated language resource entry according to the packet format information; and returning the target language resource package to the client.

Optionally, the translating the language resource data according to a predetermined automation service and returning translated language resource data to the client, includes: translating language resource entries one by one using the predetermined automation service, and obtaining translated language resource entries; and returning the translated language resource entries to the client.

Optionally, the method further includes: obtaining code logic having a translation function; and obtaining target download traffic by injecting the code logic into intercepted download traffic, and returning the target download traffic to the client.

The embodiments of the present application are applied to a proxy server. A communication connection can be established between a client and a game server by the proxy server, and the proxy server can receive game data from the game server. The received game data may be the data sent by the game server in response to an active request or actively pushed by the game server. In response to the received game data including language resource data, the proxy server can translate the language resource data according to a predetermined automation service deployed thereto and return the translated language resource data to the client so that the client can load the translated language resource data. By way of intercepting and analyzing the language resource data contained within the network request traffic, the language resource data is automatically translated, localized, and modified without obtaining the read/write permission to the game language resource package on the game running device, which enables the game to be translated and localized on certain devices that cannot realize translation and localization.

The embodiments of the present disclosure further provide a computer-readable storage medium with a computer program stored thereon. When the computer program is executed by a processor, the processor implements the following method or steps: establishing a communication connection between a client and the game server through the proxy server; receiving game data from the game server, where the game data is sent by the game server in response to an active request or actively pushed by the game server; determining language resource data contained in the game data; and translating the language resource data according to a predetermined automation service, and returning translated language resource data to the client, causing the client to load the translated language resource data.

Optionally, when the game data is sent by the game server in response to the active request, the method further includes: obtaining, in response to a download request sent by the client for the game data, feature information of the download request, where the client has turned on a proxy service deployed thereto; determining whether the download request is directed at the language resource data according to the feature information; and intercepting, in response to the download request being directed at the language resource data, download traffic returned by the game server for the game data based on the proxy service.

Optionally, the feature information includes a request path of the download request, and the determining whether the download request is directed at the language resource data according to the feature information, includes: obtaining resource name information in the request path of the download request, and a name feature directed at the language resource data, where the request path of the download request includes multiple resource data with a plurality pieces of resource name information; determining whether target resource name information that matches a naming feature of the language resource data exists among the plurality pieces of resource name information of the request path; in response to the target resource name information existing, determining, among the multiple resource data of the request path, resource data corresponding to the target resource name information as first target resource data, and determining whether second target resource data having a predetermined character exists in the first target resource data; and in response to the second target resource data existing, determining that the download request is directed at the language resource data.

Optionally, the language resource data includes a language resource package and/or a language resource entry.

Optionally, the translating the language resource data according to a predetermined automation service and returning translated language resource data to the client, includes: obtaining packet format information by performing format analysis of the language resource package using the predetermined automation service, and extracting a candidate language resource entry from the language resource package; and translating the candidate language resource entry, and generating a target language resource package by packaging translated language resource entry according to the packet format information; and returning the target language resource package to the client.

Optionally, the translating the language resource data according to a predetermined automation service and returning translated language resource data to the client, includes: translating language resource entries one by one using the predetermined automation service, and obtaining translated language resource entries; and returning the translated language resource entries to the client.

Optionally, the method further includes: obtaining code logic having a translation function; and obtaining target download traffic by injecting the code logic into intercepted download traffic, and returning the target download traffic to the client.

The embodiments of the present application are applied to a proxy server. A communication connection can be established between a client and a game server by the proxy server, and the proxy server can receive game data from the game server. The received game data may be the data sent by the game server in response to an active request or actively pushed by the game server. In response to the received game data including language resource data, the proxy server can translate the language resource data according to a predetermined automation service deployed thereto and return the translated language resource data to the client so that the client can load the translated language resource data. By way of intercepting and analyzing the language resource data contained within the network request traffic, the language resource data is automatically translated, localized, and modified without obtaining the read/write permission to the game language resource package on the game running device, which enables the game to be translated and localized on certain devices that cannot realize translation and localization.

Figure 5:
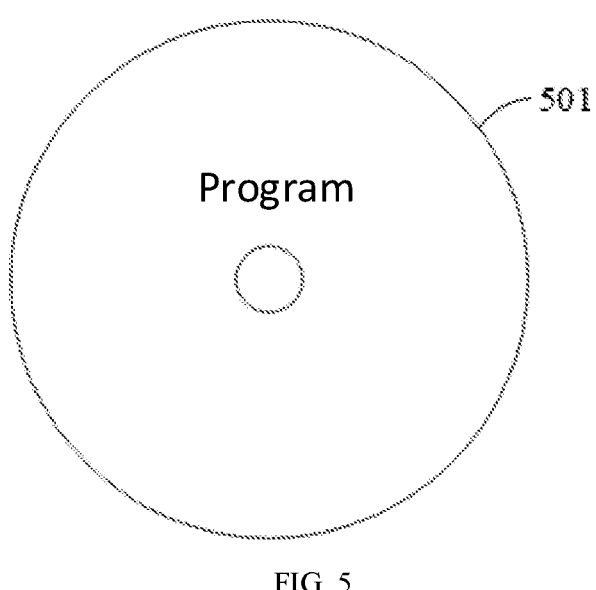
FIG. 5 is a block diagram of a structure of a computer-readable storage medium according to an embodiment of the present disclosure.

Referring to FIG. 5, a block diagram of a structure of a computer-readable storage medium according to an embodiment of the present disclosure is shown. The computer-readable storage medium 501 can store a computer program, where the computer program can be executed by the processor to achieve each process of the above embodiments of the method for translating the game, and can achieve the same technical effect, in order to avoid repetition, will not be repeated here.

The various embodiments in this specification are described in a progressive manner, with each embodiment focusing on what is different from the other embodiments, and the same similar parts between the various embodiments are sufficient to refer to each other.

It should be understood by those skilled in the art that embodiments of the present disclosure may be provided as methods, devices, or computer program products. Accordingly, embodiments of the present disclosure may take the form of entirely hardware embodiments, entirely software embodiments, or embodiments that combine software and hardware aspects. Further, embodiments of the present disclosure may take the form of a computer program product implemented on one or more computer-usable storage medium (including, but not limited to, disk memory, CD-ROM, optical memory, etc.) that contain computer-usable program code therein.

Embodiments of the present disclosure are described with reference to flowcharts and/or block diagrams of methods, client devices (systems), and computer program products according to embodiments of the present disclosure. It should be understood that each process and/or box in a flowchart and/or block diagram, and the combination of processes and/or boxes in a flowchart and/or block diagram, may be implemented by computer program instructions. These computer program instructions may be provided to a processor of a general computer, a specialized computer, an embedded processor, or other programmable data processing client device to produce a machine such that the instructions executed by the processor of the computer or other programmable data processing client device produce a device used to implement the functions specified in one or more processes of the flowchart and/or one or more boxes of the block diagram.

These computer program instructions may also be stored in a computer readable memory capable of directing the computer or other programmable data processing client device to operate in a particular manner such that the instructions stored in such computer readable memory produce an article of manufacture including an instruction device that implements the functions specified in one or more processes of the flowchart and/or one or more boxes of the block diagram.

These computer program instructions may also be loaded onto a computer or other programmable data processing client device such that a series of operational steps are performed on the computer or other programmable client device to produce computer-implemented processing, and then the instructions executed on the computer or other programmable client device provide steps for carrying out the functions specified in one or more processes of the flowchart and/or one or more boxes of the block diagram.

Although preferred embodiments of embodiments of the present disclosure have been described, those skilled in the art may make additional changes and modifications to these embodiments once the underlying creative concepts are known. Therefore, the appended claims are intended to be construed to include the preferred embodiments as well as all changes and modifications that fall within the scope of the embodiments of the present disclosure.

Finally, it should also be noted that in this disclosure, relationship terms such as "first" and "second" are used only to distinguish one entity or operation from another, and do not necessarily require or imply any such actual relationship or order between these entities or operations. Further, the terms "include/including," "contain/containing," or any other variation thereof are intended to cover non-exclusive inclusion such that a process, method, article, or client device that includes a set of elements includes not only those elements, but also other elements not explicitly listed, or also includes elements that are inherent to such a process, method, article, or client device. Without further limitation, an element defined by the phrase "including a" do not preclude the existence of additional identical elements in the process, method, article, or client device that includes the element.

The above is a detailed introduction of the method for translating the game and the apparatus for translating the game provided in this disclosure, and specific examples are applied in this disclosure to elaborate the principles and implementation of this disclosure. The above examples are only used to help understand the method of this disclosure and its core ideas, and for those of ordinary skill in the art, there will be changes in the specific implementation and scope of application based on the ideas of this disclosure, and thus, the contents of this specification should not be construed as a limitation of this disclosure.

What is claimed is:

1. A method for translating a game, comprising:
establishing, by a proxy server, a communication connection between a client and a game server through the proxy server, wherein the proxy server communicates with the game server for the game;
receiving, by the proxy server, game data from the game server, wherein the game data is sent by the game server in response to an active request or actively pushed by the game server;
determining, by the proxy server, language resource data contained in the game data, wherein the language resource data comprises at least one of a language resource package directed at the game or a language resource entry directed at the game; and
translating, by the proxy server, the language resource data according to a predetermined automation service, and returning translated language resource data to the client so that the client loads the translated language resource data.

2. The method according to claim 1, wherein, when the game data is sent by the game server in response to the active request, the method further comprises:
in response to a download request sent by the client for the game data, obtaining feature information of the download request, wherein a proxy service is deployed on the client;
determining whether the download request is directed at the language resource data according to the feature information; and
in response to the download request being directed at the language resource data, intercepting download traffic returned by the game server for the game data based on the proxy service.

3. The method according to claim 2, wherein the feature information comprises a request path of the download request, and wherein determining whether the download request is directed at the language resource data according to the feature information comprises:
obtaining resource name information in the request path of the download request, and a naming feature directed at the language resource data, wherein the request path of the download request comprises multiple resource data with a plurality pieces of resource name information;

determining whether target resource name information that matches the naming feature of the language resource data exists among the plurality pieces of resource name information of the request path;

in response to the target resource name information existing, determining, among the multiple resource data of the request path, resource data corresponding to the target resource name information as first target resource data, and determining whether second target resource data having a predetermined character exists in the first target resource data; and in response to the second target resource data existing, determining that the download request is directed at the language resource data.

4. The method according to claim 2, further comprising:

obtaining code logic having a translation function; and obtaining target download traffic by injecting the code logic into intercepted download traffic, and returning the target download traffic to the client.

5. The method according to claim 1, wherein translating the language resource data according to the predetermined automation service and returning translated language resource data to the client comprises:

obtaining packet format information by performing format analysis of the language resource package using the predetermined automation service, and extracting a candidate language resource entry from the language resource package;

translating the candidate language resource entry, and generating a target language resource package by packaging translated language resource entry according to the packet format information; and returning the target language resource package to the client.

6. The method according to claim 1, wherein translating the language resource data according to the predetermined automation service and returning translated language resource data to the client, comprises:

translating language resource entries one by one using the predetermined automation service, and obtaining translated language resource entries; and returning the translated language resource entries to the client.

7. An electronic device, comprising:

a processor, a memory, and a computer program stored on the memory and executable by the processor, wherein when the computer program is executed by the processor, the processor is configured to implement a method for translating a game comprising:

establishing a communication connection between a client and a game server through a proxy server, wherein the proxy server communicates with the game server for the game;

receiving game data from the game server, wherein the game data is sent by the game server in response to an active request or actively pushed by the game server;

determining language resource data contained in the game data, wherein the language resource data comprises at least one of a language resource package directed at the game or a language resource entry directed at the game; and translating the language resource data according to a predetermined automation service, and return translated language resource data to the client, so that the client loads the translated language resource data.

8. The electronic device according to claim 7, wherein, when the game data is sent by the game server in response to the active request, the processor is further configured to implement the method comprising:

in response to a download request sent by the client for the game data, obtaining feature information of the download request, wherein a proxy service is deployed on the client;

determining whether the download request is directed at the language resource data according to the feature information; and in response to the download request being directed at the language resource data, intercepting download traffic returned by the game server for the game data based on the proxy service.

9. The electronic device according to claim 8, wherein the feature information comprises a request path of the download request, and wherein the processor is further configured to implement the method comprising:

obtaining resource name information in the request path of the download request, and a naming feature directed at the language resource data, wherein the request path of the download request comprises multiple resource data with a plurality pieces of resource name information;

determining whether target resource name information that matches the naming feature of the language resource data exists among the plurality pieces of resource name information of the request path;

in response to the target resource name information existing, determine, among the multiple resource data of the request path, resource data corresponding to the target resource name information as first target resource data, and determine whether second target resource data having a predetermined character exists in the first target resource data; and in response to the second target resource data existing, determining that the download request is directed at the language resource data.

10. The electronic device according to claim 8, wherein the processor is further configured to implement the method comprising:

obtaining code logic having a translation function; and obtaining target download traffic by injecting the code logic into intercepted download traffic, and returning the target download traffic to the client.

11. The electronic device according to claim 7, wherein the processor is further configured to implement the method comprising:

obtaining packet format information by performing format analysis of the language resource package using the predetermined automation service, and extracting a candidate language resource entry from the language resource package; and translating the candidate language resource entry, and generating a target language resource package by packaging translated language resource entry according to the packet format information; and returning the target language resource package to the client.

12. The electronic device according to claim 7, wherein the processor is further configured to implement the method comprising:

translating language resource entries one by one using the predetermined automation service, and obtaining translated language resource entries; and returning the translated language resource entries to the client.

13. A non-transitory computer-readable storage medium with a computer program stored thereon, wherein when the computer program is executed by a processor of an electronic device, the processor implements a method for translating a game comprising:

establishing a communication connection between a client and a game server through a proxy server, wherein the proxy server communicates with the game server for the game;

receiving game data from the game server, wherein the game data is sent by the game server in response to an active request or actively pushed by the game server;

determining language resource data contained in the game data, wherein the language resource data comprises at least one of a language resource package directed at the game or a language resource entry directed at the game; and translating the language resource data according to a predetermined automation service, and return translated language resource data to the client, so that the client loads the translated language resource data.

14. The non-transitory computer-readable storage medium according to claim 13, when the game data is sent by the game server in response to the active request, the processor is further configured to implement the method comprising:

in response to a download request sent by the client for the game data, obtaining feature information of the download request, wherein a proxy service is deployed on the client;

determining whether the download request is directed at the language resource data according to the feature information; and in response to the download request being directed at the language resource data, intercepting download traffic returned by the game server for the game data based on the proxy service.

15. The non-transitory computer-readable storage medium according to claim 14, the feature information comprises a request path of the download request, and wherein the processor is further configured to implement the method comprising:

obtaining resource name information in the request path of the download request, and a naming feature directed at the language resource data, wherein the request path of the download request comprises multiple resource data with a plurality pieces of resource name information;

determining whether target resource name information that matches the naming feature of the language resource data exists among the plurality pieces of resource name information of the request path;

in response to the target resource name information existing, determine, among the multiple resource data of the request path, resource data corresponding to the target resource name information as first target resource data, and determine whether second target resource data having a predetermined character exists in the first target resource data; and in response to the second target resource data existing, determining that the download request is directed at the language resource data.

16. The non-transitory computer-readable storage medium according to claim 13, wherein the processor is further configured to implement the method comprising:

obtaining packet format information by performing format analysis of the language resource package using the predetermined automation service, and extracting a candidate language resource entry from the language resource package; and translating the candidate language resource entry, and generating a target language resource package by packaging translated language resource entry according to the packet format information; and returning the target language resource package to the client.

* * * * *